United States Patent Office 2,731,385
Patented Jan. 17, 1956

2,731,385

3-AMINO-AS-TRIAZINE-SUBSTITUTED UREA COMPLEXES AND PROCESSES FOR PREPARING THE SAME

Robert C. O'Neill, New York, N. Y., and Arthur J. Basso, Colonia, N. J., assignors to Merck & Co., Inc., Rahway, N. J., a corporation of New Jersey No Drawing. Application March 10, 1955,
Serial No. 493,613

14 Claims. (Cl. 167—53.1)

This invention relates to novel 3-amino-as-triazine-substituted urea complexes and to the processes for preparing these novel compounds.

This application is a continuation-in-part of Serial No. 413,961, filed March 3, 1954, now abandoned.

It has been found that these 3-amino-as-triazine-substituted urea complexes possess marked and effective action in the control and treatment of the disease coccidiosis which infects poultry.

The novel 3-amino-as-triazine-substituted urea complexes with which this invention is concerned may be represented by the following structural formula:

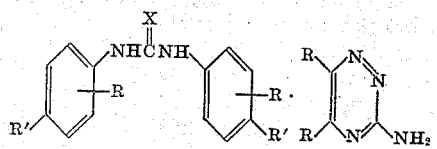

wherein R is hydrogen or a lower alkyl group, R' is an electron withdrawing group and X is oxygen or sulfur.

These 3-amino-as-triazine-substituted urea complexes are new chemical compounds. They are equimolar complexes which have their own characteristic properties that are markedly different from the component parts and are not mere mixtures of 3-amino-as-triazine and substituted urea compounds.

These novel 3-amino-as-triazine-substituted urea complexes are produced by reacting a substituted urea compound represented by the formula—

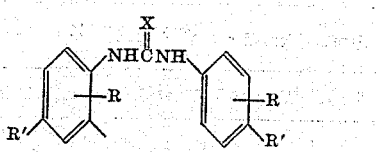

wherein R is hydrogen or a lower alkyl group, R' is an electron withdrawing group, with a 3-amino-as-triazine compound represented by the formula—

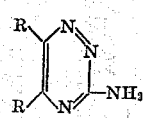

wherein R is as above.

The substituted urea compounds which may be employed as one of the starting materials in this process are carbanilide compounds having an electron withdrawing group in either or both of the 4 and 4'-positions of the rings. Examples of electron withdrawing groups which may be used are nitro, cyano, carboxy, carboalkoxy, acetyl, methyl sulfonyl, trimethyl ammonium, sulfonic acid and carbamido groups. Such groups are alternatively referred to as meta directing (See Fieser & Fieser, "Organic Chemistry," 2nd edition 1950, page 595). Specific carbanilide compounds which may be employed include 4,4'-dinitrocarbanilide; 2-methyl-4,4'-dinitrocarbanilide; 4-nitro-4'-cyanocarbanilide and 4-nitro-4'-acetocarbanilide.

The 3-amino-as-triazine which may be employed in this invention include 3-amino-as-triazine, 3-amino-5(6)-methyl-as-triazine, 3-amino-5,6-dimethyl-as-triazine.

In accordance with one procedure for carrying out the process of this invention the solid substituted urea compound is reacted with a solution of the 3-amino-as-triazine compound. The reaction mixture in which the substituted urea compound is ordinarily insoluble or very slightly soluble is stirred until the insoluble complex is formed. The insoluble 3-amino-as-triazine-substituted urea complex is then filtered, washed and dried.

The reaction solvent is not critical. Ethers such as dioxane and ethyl ether, alcohols such as the lower aliphatic alcohols, hydrocarbons such as benzene, toluene, water or mixtures of such solvents may be employed satisfactorily. It has been found advantageous to employ a solvent in which the 3-amino-as-triazine is soluble and in which the substituted urea is insoluble.

As the substituted urea compound it is preferred to employ 4,4'-dinitrocarbanilide, although other carbanilides having different electron withdrawing groups in the 4 and 4'-positions may be used. Typical substitutents which may be present in these positions are nitro, cyano, carboxyl and carboalkoxyl radicals. Furthermore, the electron withdrawing groups at the 4 and 4' positions need not be the same, thus typical examples of 4,4' disubstituted carbanilides useful in the invention are 4,4'-dinitrocarbanilide; 4,4'-dicyanocarbanilide and 4-nitro-4'-cyanocarbanilide.

The 3-amino-as-triazine-substituted urea complexes prepared in accordance with this invention are active against the widespread poultry disease commonly called "Coccidiosis" which is caused by species of protozoan parasites of the genus Eimeria. In this regard, E. tenella is responsible for a severe and frequently fatal infection of the cecum of chickens. Furthermore, other serious infections are caused in fowl by other species of Eimeria and especially E. acervulina, E. necatrix, E. maxima, and E. brunetti. If left untreated, such infections often cause extensive losses of fowl. The elimination or control of coccidiosis is, therefore, of the utmost importance for successful poultry raising.

According to a further embodiment of this invention, novel compositions useful in the treatment of coccidiosis are provided containing the 3-amino-as-triazine-substituted urea complex as the active ingredient. These compositions comprise the 3-amino-as-triazine-substituted urea complex intimately combined with an inert carrier. In this regard compositions which contain a compound of the formula—

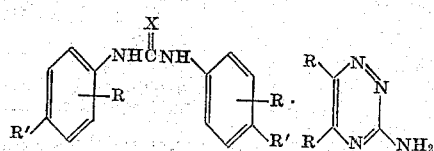

wherein R is hydrogen or lower alkyl groups, R' is an electron withdrawing group and X is oxygen or sulfur, as the active ingredient have been found to be particularly useful against coccidiosis.

These compositions comprise at least one of the 3-amino-as-triazine-substituted urea complexes mentioned above combined with an inert carrier or diluent. Such compositions are conveniently produced by intimately dispersing the active ingredient throughout a carrier. The carrier or diluent may be either liquid or solid. Liquid dispersions can be prepared satisfactorily by using emulsifiers and surface active agents. Any solid can be used as a carrier which is inert toward the active compounds and which can be administered to animals with safety. Examples of suitable carriers are ground oyster shells, attapulgus clay and edible vegetable materials such as commercial animal and poultry feeds, urea, corn meal, ground corn, citrus meal, fermentation residues and distillers dried grains. The active ingredient is conveniently dispersed in a solid carrier by conventional methods such as stirring, tumbling, and grinding. In this manner, by selecting different carriers and by altering the ratio of carrier to active ingredient, compositions of varying concentration can be prepared. Compositions very suitable for addition to poultry feed may contain from about 5% to about 40% of the new coccidiostat, and preferably about 10-25%, adsorbed on or mixed with a carrier.

Premixes of 4,4'-dinitrocarbanilide·3-amino-as-triazine complex may be prepared as referred to above in a general manner. Two satisfactory formulations are described in detail below.

A. Ingredients:

a. 4,4'-dinitrocarbanilide·3-amino-as-triazine complex
b. Corn distillers dried grains
c. Wheat shorts
d. Dried vitamin $B_{12}$ fermentation solubles

*Composition.*—Each pound of the mixture preparation contains 0.30 pound of coccidiostat drug. In order to prepare 1000 pounds of feed premix the following quantities are employed:

a. 300 pounds 4,4'-dinitrocarbanilide·3-amino-as-triazine complex
b. 175 pounds corn distillers dried grains (through 30 mesh screen)
c. 455 pounds wheat shorts (30-80 mesh)
d. 70 pounds dried vitamin $B_{12}$ fermentation solubles (30-80 mesh)

The total amounts of wheat shorts and fermentation solids, and about 150 pounds of corn grains are mixed followed by the drug and the remainder of the corn grains. After mixing for about two hours the material is ready for packaging.

B. Ingredients:

a. 4,4'-dinitrocarbanilide·3-amino-as-triazine complex
b. Corn distillers dried grains
c. Wheat shorts
d. Dried vitamin $B_{12}$ fermentation solubles

*Composition.*—Each pound of the mixture contains 0.25 pound of coccidiostat.

*Preparation.*—The following quantities are employed in order to make 995 pounds of product:

a. 250 pounds 4,4'-dinitrocarbanilide·3-amino-as-triazine complex
b. 188 pounds corn distillers dried grains (through 30 mesh screen)
c. 487 pounds wheat shorts (30-80 mesh)
d. 70 pounds dried vitamin $B_{12}$ fermentation solubles (30-80 mesh)

Products such as the above are suitable for incorporation into poultry feedstuffs in order to obtain the desired dosage level of active drug.

The amount of active ingredient required for effective prophylactic control of coccidiosis is very low. With regard to poultry, good results have been obtained by the administration of a quantity of the active ingredient equal to about .005% to .05% of the food consumed. Optimum results are usually obtained by the daily administration of a quantity of active ingredient equal to about .0075% to about .025% of the food consumed. Such relatively small amounts may be conveniently incorporated in the normal ration prior to feeding the poultry. Although the prophylactic use is by far the more important application of coccidiostatic compounds, their use in therapy of the disease is highly valuable. Larger concentrations of up to about 0.1% of these new complexes may be employed therapeutically if an outbreak of the disease is encountered.

The coccidiostatic activity of compositions containing various 3-amino-as-triazine·substituted urea complexes was experimentally demonstrated according to the following test:

Groups of ten two-week old chicks were fed a mash feed containing from 0.01% to 0.04% of the active ingredient uniformly dispersed therein. After existing on the diet for 24 hours, each chick was inoculated with 50,000 sporulated oocysts of *E. tenella*. In addition, groups of ten chicks were also infected but fed a diet free of the active ingredient and used as positive controls. Still other groups were treated separately with the substituted urea compound and the 3-amino-as-triazine compound and with physical mixtures of the substituted urea compound and the 3-amino-as-triazine compound. The experiment was terminated after inoculation and the following results were obtained. The oocyst count (number of parasites of *E. tenella* remaining) was determined by sacrificing the birds and examining the infected organs microscopically.

| Compound | Percent Compound in Diet | Percent Mortality | | Oocyst Count × $10^6$ | | Percent Weight Gain | |
|---|---|---|---|---|---|---|---|
| | | Treated | Untreated | Treated | Untreated | Treated | Untreated |
| 4,4'-dinitrocarbanilide | 0.1 | 0 | 40 | 20 | 34 | 60 | 45 |
|  | 0.05 | 0 | 40 | 28 | 34 | 66 | 45 |
|  | 0.025 | 20 | 40 | 29 | 34 | 54 | 45 |
| 4,4'-dinitrothiocarbanilide | 0.1 | 10 | 20 | 12.4 | 16.7 | 59 | 39 |
| 3-amino-as-triazine | 0.1 | 20 | 17 | 43 | 23 | 26 | 15 |
| A physical mixture of: 4,4'-dinitrocarbanilide and 3-amino-as-triazine | 0.1 | 0 | 33 | 13 | 26 | 56 | 28 |
| 4,4'-dinitrocarbanilide·3-amino-as-triazine complex | 0.1 | 0 | 30 | <0.1 | 25 | 63 | 25 |
|  | 0.04 | 0 | 30 | <0.1 | 25 | 68 | 25 |
|  | 0.02 | 0 | 30 | 0.2 | 25 | 52 | 25 |
|  | 0.015 | 0 | 30 | 6.4 | 31 | 66 | 25 |
|  | 0.01 | 0 | 30 |  |  |  |  |
|  | 0.008 | 0 | 45 | 24.6 | 24 | 63 | 43 |
| 4,4'-dinitrothiocarbanilide·3-amino-as-triazine complex | 0.1 | 0 | 20 | 0.1 | 16.7 | 73 | 39 |

It will be noted from Table I that 4,4'-dinitrocarbanilide and 4,4'-dinitrothiocarbanilide when administered separately do have some activity, but such activity does not approach that displayed by the complex. The complexing agents of themselves are inactive.

The following examples are intended to be illustrative only and may be varied or modified without departing from the spirit and scope of this invention.

Example 1

4,4'-DINITROCARBANILIDE-3-AMINO-AS-TRIAZINE COMPLEX

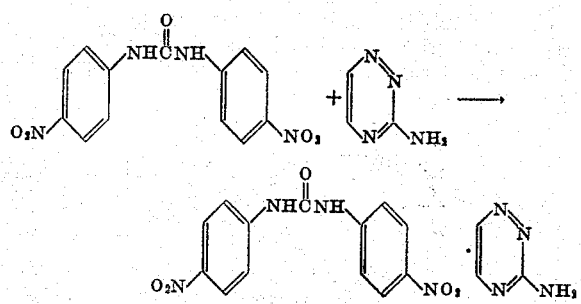

242.8 grams (2.5 moles) of 3-amino-as-triazine were added to four liters of dioxane and the mixture heated to about 80° C. whereupon a clear solution was obtained. To this clear solution was added 604 g. (2.0 moles) of 4,4'-dinitrocarbanilide. The urea solution rapidly diminished in intensity of color, becoming a uniform mustard color within thirty minutes. The slurry was stirred at 80–100° C. for three and one-half hours. The product was collected by suction filtration and the cake was washed with dioxane, ether, and air-dried to constant weight.

The dry, mustard-colored 4,4'-dinitrocarbanilide·3-amino-as-triazine complex weighed 784 g. (98.2%), and melted with decomposition at 268–269° C.

*Analysis.*—For $C_{16}H_{14}O_5N_8$ (1:1 molar complex):
Calcd.: N, 28.13; percent 3-amino-as-triazine=24.1.
Found: N, 27.55; percent 3-amino-as-triazine=24.1 (by u. v. analysis)

Among the characteristic bands in the infra red spectrum of the complex is one at 2.9 $\mu$ and another at 9.4 $\mu$, neither of which is present in the spectrum of either component alone.

X-ray powder diagram analyses show the two components and the complex to have different crystal lattices.

Water and ethanol solutions of the triazine, at room temperature, gave equally good yields of complex.

Example 2

4,4'-DINITROTHIOCARBANILIDE-3-AMINO-AS-TRIAZINE COMPLEX

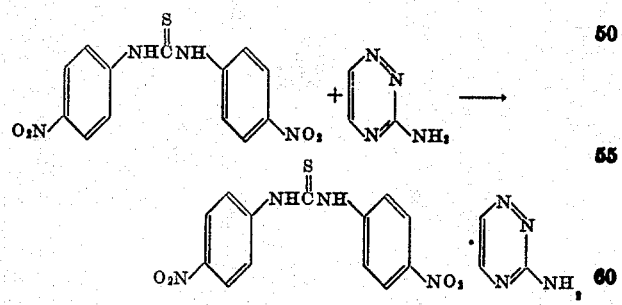

6.36 g. (0.02 mole) of 4,4'-dinitrothiocarbanilide was suspended in 120 ml. of ethylene glycol dimethyl ether. To this suspension was added 2.5 g. (0.026 mole) of 3-amino-as-triazine dissolved in 50 ml. of warm ethanol. Within one minute the suspended solid began to change in color and texture. After five hours stirring at room temperature, the complex was filtered, washed with absolute alcohol, and dried to constant weight (7.05 g.).

The 3-amino-as-triazine complex of 4,4'-dinitrothiocarbanilide thus prepared melted to a reddish brown liquid at 195–196° C.

Any departure from the above description which conforms to the present invention is intended to be included within the scope of the claims.

What is claimed is:

1. A compound of the formula—

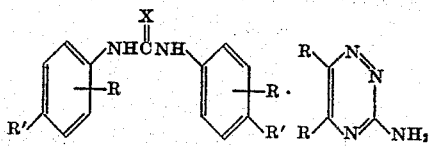

wherein R is selected from the group consisting of hydrogen and lower alkyl groups, R' is an electron withdrawing group and X is selected from the group consisting of oxygen and sulfur.

2. A compound of the formula—

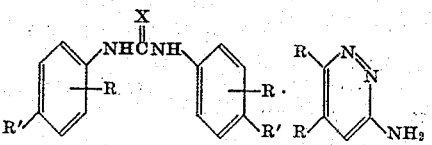

wherein R is selected from the group consisting of hydrogen and lower alkyl groups and R' is an electron withdrawing group, at least one R' being a nitro group and X is selected from the group consisting of oxygen and sulfur.

3. A compound of the formula—

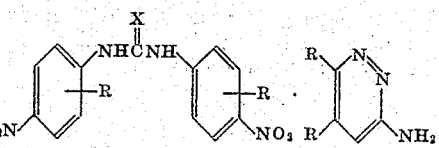

wherein R is selected from the group consisting of hydrogen and lower alkyl groups and X is selected from the group consisting of oxygen and sulfur.

4. 4,4'-dinitrocarbanilide·3-amino-as-triazine complex.

5. 4,4'-dinitrothiocarbanilide·3-amino-as-triazine complex.

6. The process which comprises reacting a compound represented by the formula—

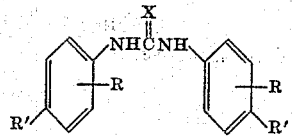

wherein R is selected from the group consisting of hydrogen and lower alkyl groups, R' is an electron withdrawing group and X is selected from the group consisting of oxygen and sulfur with a compound represented by the formula—

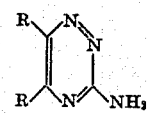

wherein R is as above to form a complex represented by the formula—

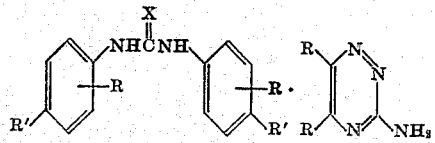

wherein R, and R' and X are as above.

7. The process which comprises reacting a compound represented by the formula—

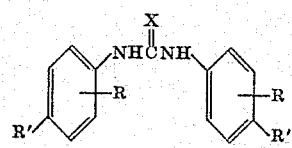

wherein R is selected from the group consisting of hydrogen and lower alkyl groups, R' is an electron withdrawing group, at least one R' being a nitro group and X is selected from the group consisting of oxygen and sulfur with a compound represented by the formula—

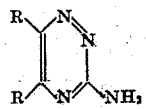

wherein R is as above to form a complex represented by the formula—

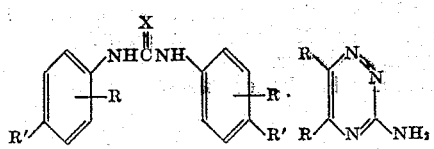

wherein R, R' and X are as above.

8. The process which comprises reacting a compound represented by the formula—

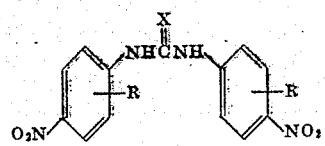

wherein R is selected from the group consisting of hydrogen and lower alkyl groups and X is selected from the group consisting of oxygen and sulfur with a compound represented by the formula—

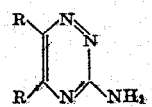

wherein R is as above to form a complex represented by the formula—

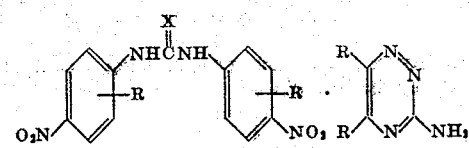

wherein R and X are as above.

9. The process which comprises reacting 4,4'-dinitrocarbanilide with 3-amino-as-triazine to form 4,4'-dinitrocarbanilide·3-amino-as-triazine complex.

10. The process which comprises reacting 4,4'-dinitrothiocarbanilide with 3-amino-as-triazine to form 4,4'-dinitrothiocarbanilide·3-amino-as-triazine complex.

11. A composition useful against coccidiosis which comprises an inert carrier and a compound represented by the formula—

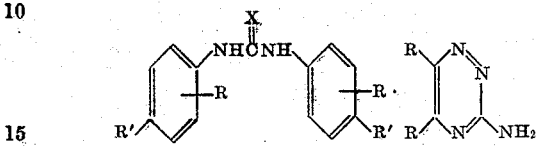

wherein R is selected from the group consisting of hydrogen and lower alkyl groups, R' is an electron withdrawing group and X is selected from the group consisting of oxygen and sulfur.

12. A composition useful against coccidiosis which comprises an animal feedstuff and a compound represented by the formula—

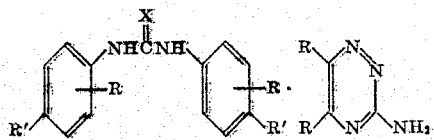

wherein R is selected from the group consisting of hydrogen and lower alkyl groups, R' is an electron withdrawing group and X is selected from the group consisting of oxygen and sulfur.

13. A composition useful against coccidiosis which comprises 4,4'-dinitrocarbanilide·3-amino-as-triazine complex, intimately dispersed in an inert carrier.

14. A composition useful against coccidiosis which comprises 4,4'-dinitrothiocarbanilide·3-amino-as-triazine complex intimately dispersed in an inert carrier.

No references cited.